US006468697B1

(12) United States Patent
Ferment et al.

(10) Patent No.: US 6,468,697 B1
(45) Date of Patent: Oct. 22, 2002

(54) COMPOSITE POLYMER ELECTROLYTES CONTAINING ELECTRICALLY NON-CONDUCTIVE CHOPPED FIBERS

(75) Inventors: George R. Ferment, Randolph, NJ (US); Joseph B. Kejha, Meadowbrook, PA (US)

(73) Assignee: Lithium Technology Corporation, Plymouth Meeting, PA (US)

( * ) Notice: Subject to any disclaimer, the term of this patent is extended or adjusted under 35 U.S.C. 154(b) by 0 days.

(21) Appl. No.: 09/422,724

(22) Filed: Oct. 22, 1999

(51) Int. Cl.$^7$ ................................................ H01M 2/16
(52) U.S. Cl. ....................................... 429/306; 429/303
(58) Field of Search ................................ 429/188, 304, 429/305, 306, 303

(56) References Cited

U.S. PATENT DOCUMENTS 5,085,952 A * 2/1992 North .......................... 429/192
5,437,941 A * 8/1995 Arledge et al. .............. 429/129
5,472,808 A * 12/1995 Peled et al. .................. 429/192
5,523,181 A * 6/1996 Stonehart et al. ........... 429/192
5,622,792 A * 4/1997 Brochu et al. ............... 429/192

OTHER PUBLICATIONS

Quartarone et al., "PEO–based composite polymer electrolytes", Solid State Ionics, 110 (Jul. 1998) 1–14.*

* cited by examiner

Primary Examiner—Carol Chaney
(74) Attorney, Agent, or Firm—Drinker Biddle & Reath LLP

(57) ABSTRACT

Composite polymer electrolytes for use in alkali-metal based electrochemical devices, which electrolytes contain chopped electrically non-conductive fibers in an electrolyte slurry which has been cured on a release tape and then pressed onto an electrode, or which slurry is coated directly onto said electrode, and then cured.

16 Claims, No Drawings

COMPOSITE POLYMER ELECTROLYTES CONTAINING ELECTRICALLY NON-CONDUCTIVE CHOPPED FIBERS

BACKGROUND OF THE INVENTION

1. Field of the Invention

This invention is directed to composite polymer electrolytes for alkali metal or alkali metal—ion based electrochemical devices that contain electrically non-conductive fibers, which have been chopped into short lengths and mixed with other components to form the electrolytes.

2. Description of the Prior Art

Electrochemical devices such as batteries of the solid state type consist of at least an anode, a layer of electrolyte, and a cathode. A variety of compositions have been proposed for polymer electrolytes which have advantages and disadvantages. It is desirable to have electrolytes which are strong, with mechanical resistance against compression and shorting. The electrolytes contain additions to meet the described requirements such as powdered electrically non-conductive particles, mats, or woven or non woven fabric, as described in prior U.S. patent application Ser. No. 09/006,057, filed Jan. 12, 1999.

Examples of other prior art structures are shown and described in the U.S. Patents to Balanger, No. 3,485,677; Rippel, et al., No. 4,275,130; Basu, No. 4,304,825; Bannister, No. 4,471,370; Suguichi, et al., No. 4,496,638; Murray, No. 4,497,883; Skotheim, No. 4,529,086; Hope, et al., No. 5,102,752; Kejha, et al. No. 5,521,023; and Kejha No. 5,705,084.

While the described composite electrolytes are satisfactory for some uses, they may be subject to problems, such as delamination, or excess weight, or cost, or high resistance, or incompatibility with other components. The composite electrolytes of the invention do not suffer from these problems and provide many advantages.

SUMMARY OF THE INVENTION

It has now been found that composite polymer electrolytes that contain electrically non-conductive chopped fibers for use in alkali metal based electrochemical devices, such as batteries, capacitors and sensors, provide a strong lightweight composite structure, with a long shelf and operating life, with increased mechanical resistance to compression and shorting, and which are suitable for mass production, providing a rugged device with improved yield.

The principal object of the invention is to provide composite polymer electrolytes for alkali metal based electrochemical devices which contain electrically non-conductive chopped fibers, with improved mechanical resistance to compression and shorting.

A further object of the invention is to provide composite polymer electrolytes for alkali metal based electrochemical devices, which are useful with a wide variety of devices.

A further object of the invention is to provide composite polymer electrolytes for alkali metal based electrochemical devices, which electrolytes can be formed separately, or coated directly onto an electrode.

A further object of the invention is to provide composite polymer electrolytes for alkali metal based electrochemical devices that have high ionic conductivity and lend themselves to economical mass production.

Other objects and advantageous features of the invention will be apparent from the description and claims.

It should, of course, be understood that the description is merely illustrative and that various modifications and changes can be made in the structures disclosed without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Alkali metal-polymer batteries such as alkali metal or alkaline earth metal-polymer batteries, and for example lithium-ion polymer batteries, consist of at least an anode or negative electrode, a polymer, ion-conductive layer, and a cathode or positive electrode. Such batteries can be of virtually any desired size and configuration, and usually include additional layers such as current conducting backing layers, insulating layers and connection layers. In batteries with liquid electrolytes, the polymer layer is replaced by a porous membrane with liquid electrolyte.

For purposes of illustration, the battery to be described in which the electrolyte is to be incorporated is of the lithium type, but other alkali metals or alkaline earth metals can be used if desired. The battery includes a base (not shown), which may act as a current collector and/or carrier of the electrode.

To the base (not shown) is added a layer (not shown) of composite electrode. On the top of this electrode is added an ionically conductive electrolyte layer to be described.

Electrically non-conductive fibers, such as plastic fibers, or glass, or ceramic fibers are chopped into small pieces and mixed into an electrolyte slurry, which slurry includes a polymer as a binder, and may contain at least one aprotic liquid with at least one salt. The slurry may also contain a solvent and/or a plasticizer of well known type.

The composite electrolyte slurry is coated or casted onto a release tape or directly onto a battery electrode.

If a release tape is used, then the slurry is solidified by any well known means such as solvent evaporation and/or cooling, or radiation, or heat activated cross-linking, or full or partial evaporation of the solvent in the electrolyte.

The resultant electrolyte layer is peeled off and pressed onto an electrode, or between electrodes.

If the slurry was coated onto at least one electrode it is solidified as described above and adheres to the electrode. If desired, another electrode may be placed on top of the electrolyte layer prior to solidification.

Alternatively, the electrolyte solution may be coated or casted onto a release tape, or directly onto a battery electrode, and the chopped fibers then uniformly dispersed on the wet electrolyte layer.

The presence of the chopped electrically non-conductive fibers markedly improves the mechanical resistance to compression and shorting and do not decrease ionic conductivity.

For other types of batteries, appropriate chemistry layers may be applied onto the electrolyte layer.

It will thus be seen that structures have been provided with which the objects of the invention are achieved.

We claim:

1. An alkali metal based electrochemical device, which device includes a negative electrode, a polymer composite electrolyte, and a positive electrode, wherein the electrolyte includes an ionically conductive polymer as a binder and chopped electrically non-conductive fibers.

2. An electrochemical device as defined in claim 1 in which said fibers are plastic fibers.

3. An electrochemical device as defined in claim 1, in which said fibers are glass fibers.

4. An electrochemical device as defined in claim 1, in which said fibers are ceramic fibers.

5. An electrochemical device as defined in claim 1, in which said polymer composite electrolyte material was formed as a slurry to which said chopped electrically non-conductive fibers were added, a release tape was provided onto which said slurry was coated, and said slurry was solidified.

6. An electrochemical device as defined in claim 5, in which said slurry was solidified by cooling and solvent evaporation.

7. An electrochemical device as defined in claim 5, in which said slurry was solidified by cooling.

8. An electrochemical device as defined in claim 5, in which said slurry was solidified by solvent evaporation.

9. An electrochemical device as defined in claim 5, in which said slurry was solidified by radiation.

10. An electrochemical device as defined in claim 5, in which said slurry was solidified by heat cross-linking.

11. An electrochemical device as defined in claims 5 or 6, in which said composite electrolyte was formed as a slurry to which said chopped fibers were added, said composite electrolyte was coated directly onto at least one of said electrodes, and said slurry was solidified.

12. An electrochemical device as defined in claim 11, in which said slurry was solidified by cooling and solvent evaporation.

13. A composite electrolyte as defined in claim 11, in which said slurry was cured by cooling.

14. A composite electrolyte as defined in claim 11, in which said slurry was solidified by solvent evaporation.

15. A composite electrolyte as defined in claim 11, in which said slurry was cured by radiation.

16. A composite electrolyte as defined in claim 11, in which said slurry was solidified by heat cross-linking.

* * * * *